(12) United States Patent
Lee et al.

(10) Patent No.: US 11,069,479 B2
(45) Date of Patent: Jul. 20, 2021

(54) MULTILAYER CAPACITOR

(71) Applicant: SAMSUNG ELECTRO-MECHANICS CO., LTD., Suwon-si (KR)

(72) Inventors: Hee Soo Lee, Suwon-si (KR); Ah Young Shin, Suwon-si (KR); Dong Hoon Kim, Suwon-si (KR); Jong Hoon Kim, Suwon-si (KR); Hong Seok Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 2 days.

(21) Appl. No.: 16/287,757

(22) Filed: Feb. 27, 2019

(65) Prior Publication Data

US 2020/0027658 A1 Jan. 23, 2020

(30) Foreign Application Priority Data

Jul. 19, 2018 (KR) .......................... 10-2018-0084000

(51) Int. Cl.
*H01G 4/012* (2006.01)
*H01G 4/232* (2006.01)
(Continued)

(52) U.S. Cl.
CPC ........... *H01G 4/012* (2013.01); *H01G 4/2325* (2013.01); *H01G 4/30* (2013.01); *H01G 4/1227* (2013.01)

(58) Field of Classification Search
CPC .......... H01G 4/30; H01G 4/005; H01G 4/232; H01G 4/012; H01G 4/2325; H01G 4/1227; H10G 4/232
(Continued)

(56) References Cited

U.S. PATENT DOCUMENTS

2009/0316330 A1* 12/2009 Taniguchi ............... H01G 4/232
361/306.3
2010/0039749 A1* 2/2010 Ritter ..................... H01G 4/005
361/301.4
(Continued)

FOREIGN PATENT DOCUMENTS

JP 2007-36003 A 2/2007
JP 2016-021437 A 2/2016
(Continued)

OTHER PUBLICATIONS

Office Action issued in Korean Application No. 10-2018-0084000 dated Jun. 27, 2019, with English translation.

*Primary Examiner* — Arun Ramaswamy
(74) *Attorney, Agent, or Firm* — Morgan, Lewis & Bockius LLP

(57) ABSTRACT

A multilayer capacitor may include a capacitor body including an active area including a plurality of dielectric layers, and a plurality of first and second internal electrodes, upper and lower cover layers disposed on upper and lower surfaces of the active area, and having first to six external surfaces; first and second external electrodes including first and second connection portions and first and second band portions, respectively; and a plurality of dummy electrodes disposed on the upper and lower cover layers with a dielectric layer interposed therebetween, and exposed through corners of the capacitor body, a portion of the plurality of dummy electrodes being disposed between the upper and lower surfaces of the capacitor body and the first and second band portions.

10 Claims, 6 Drawing Sheets

(51) Int. Cl.
*H01G 4/12* (2006.01)
*H01G 4/30* (2006.01)

(58) Field of Classification Search
USPC ............ 361/321.1, 303, 321.3, 306.3, 321.2, 361/301.4, 304
See application file for complete search history.

(56) References Cited

U.S. PATENT DOCUMENTS

| | | | |
|---|---|---|---|
| 2013/0093556 A1* | 4/2013 | Lim | ........................ H01F 27/29 336/200 |
| 2014/0311782 A1* | 10/2014 | Lee | ........................ H05K 1/181 174/260 |
| 2017/0162322 A1 | 6/2017 | Park et al. | |
| 2017/0345569 A1 | 11/2017 | Sakatsume | |
| 2018/0182551 A1 | 6/2018 | Ahn et al. | |

FOREIGN PATENT DOCUMENTS

| | | | |
|---|---|---|---|
| KR | 10-2017-0065919 A | 6/2017 |
| KR | 10-2017-0135664 A | 12/2017 |
| KR | 10-2018-0073083 A | 7/2018 |

* cited by examiner

MULTILAYER CAPACITOR

CROSS-REFERENCE TO RELATED APPLICATION(S)

This application claims benefit of priority to Korean Patent Application No. 10-2018-0084000 filed on Jul. 19, 2018 in the Korean Intellectual Property Office, the disclosure of which is incorporated herein by reference in its entirety.

BACKGROUND OF THE INVENTION

1. Field

The present disclosure relates to a multilayer capacitor.

2. Description of Related Art

A multilayer capacitor has a small size, high capacity ensured therein, and facilitates mounting. Therefore, such a multilayer capacitor is mounted on the circuit boards of various electronic products, including image display devices, such as liquid crystal displays (LCDs), plasma display panels (PDPs), and the like, computers, smartphones, cellular phones, and the like, to charge or discharge electricity.

Such a multilayer capacitor has a conductive material applied to both end portions of a body thereof to form external electrodes.

At this time, a thickness of the external electrode formed at a corner portion of the capacitor body may be thinner than a thickness of the external electrode formed in a central portion of a laminated body.

Accordingly, moisture, ions, conductive foreign substances, and the like may penetrate through exposed surfaces of internal electrodes through a corner portion of the capacitor body, which may cause deterioration of insulating resistance, reliability of the multilayer capacitor, and the like.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a multilayer capacitor with improved moisture resistance reliability.

According to various aspects of the present disclosure, a multilayer capacitor includes a capacitor body including an active area including a plurality of dielectric layers and a plurality of first and second internal electrodes alternately disposed with the dielectric layer interposed therebetween, upper and lower cover layers disposed on upper and lower surfaces of the active area, and having first and second external surfaces opposing each other, third and fourth external surfaces connected to the first and second external surfaces and opposing each other, fifth and sixth external surfaces connected to the first and second external surfaces, connected to the third and fourth external surfaces and opposing each other, one ends of the first and second internal electrodes being exposed through the third and fourth external surfaces, respectively; first and second external electrodes including first and second connection portions disposed on the third and fourth external surfaces of the capacitor body, respectively, to be connected to the first and second internal electrodes, respectively, and first and second band portions each extending from the first and second connection portions to portions of the first, second, fifth, and sixth external surfaces of the capacitor body, respectively; and a plurality of dummy electrodes disposed on the upper and lower cover layers with a dielectric layer interposed therebetween and exposed through corners of the capacitor body, a portion of dummy electrodes being disposed between the upper and lower surfaces of the capacitor body and the first and second band portions.

In an exemplary embodiment in the present disclosure, a plurality of dummy electrodes disposed in one dielectric layer may be spaced apart from each other.

In an exemplary embodiment in the present disclosure, the plurality of dummy electrodes may be exposed through the third or fourth surfaces of the capacitor body.

In an exemplary embodiment in the present exemplary embodiment, the plurality of dummy electrodes may be exposed through the fifth or sixth surfaces of the capacitor body.

In an exemplary embodiment in the present disclosure, the dummy electrode may be exposed through each corner of the capacitor body, and may be disposed to be spaced apart from each other.

In an exemplary embodiment in the present disclosure, the plurality of dummy electrodes may be disposed one by one at four corners of one dielectric layer.

In an exemplary embodiment in the present disclosure, the plurality of dummy electrodes may be exposed through an entirety of the third surface or an entirety of the fourth surface of the dielectric layer.

In an exemplary embodiment in the present disclosure, the multilayer capacitor may further include an insulating layer disposed on the fifth and sixth surfaces of the capacitor body.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF DRAWINGS

The above and other aspects, features, and advantages of the present disclosure will be more clearly understood from the following detailed description, taken in conjunction with the accompanying drawings, in which.

Figure 1:
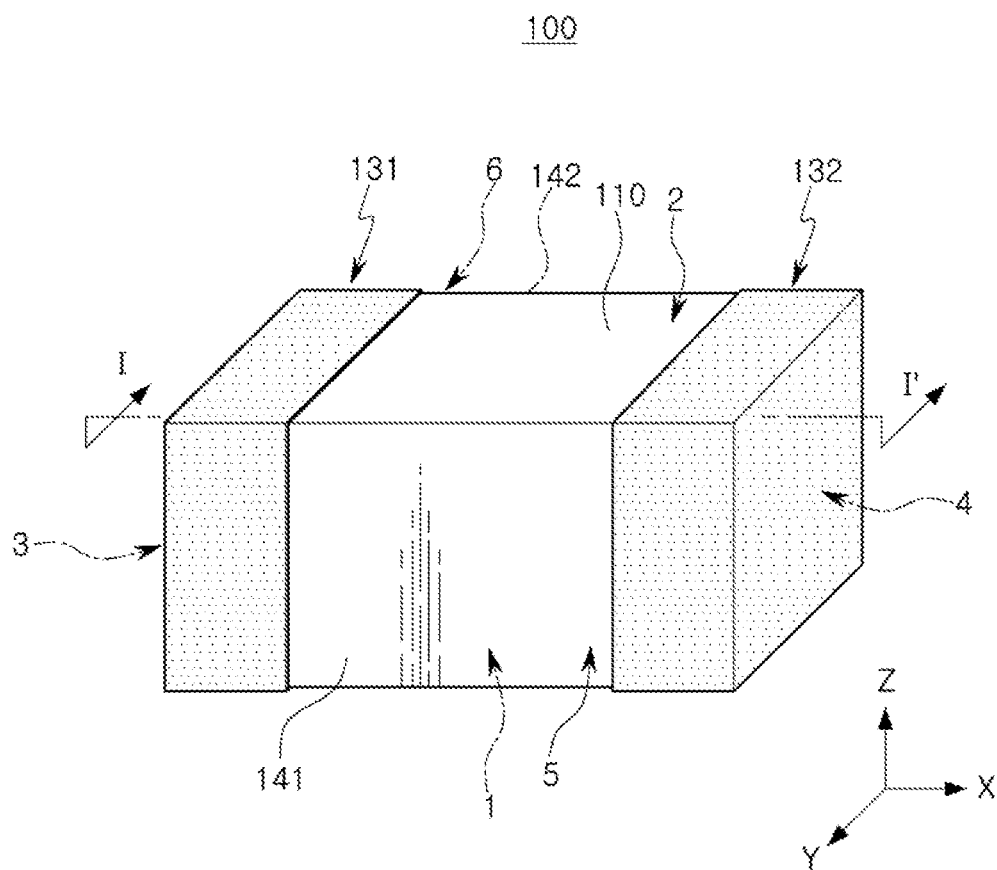
FIG. 1 is a perspective view of a multilayer capacitor according to an exemplary embodiment of the present disclosure

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present disclosure will be described in detail with reference to the accompanying drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity.

Furthermore, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

Hereinafter, when a direction of a capacitor body 110 is defined to clearly explain an exemplary embodiment in the present disclosure, X, Y and Z shown in figures represent a length direction, a width direction and a thickness direction of the capacitor body 110, respectively. Furthermore, in the exemplary embodiment of the present disclosure, the Z direction may be conceptually the same as a lamination direction in which dielectric layers are laminated.

Figure 2:
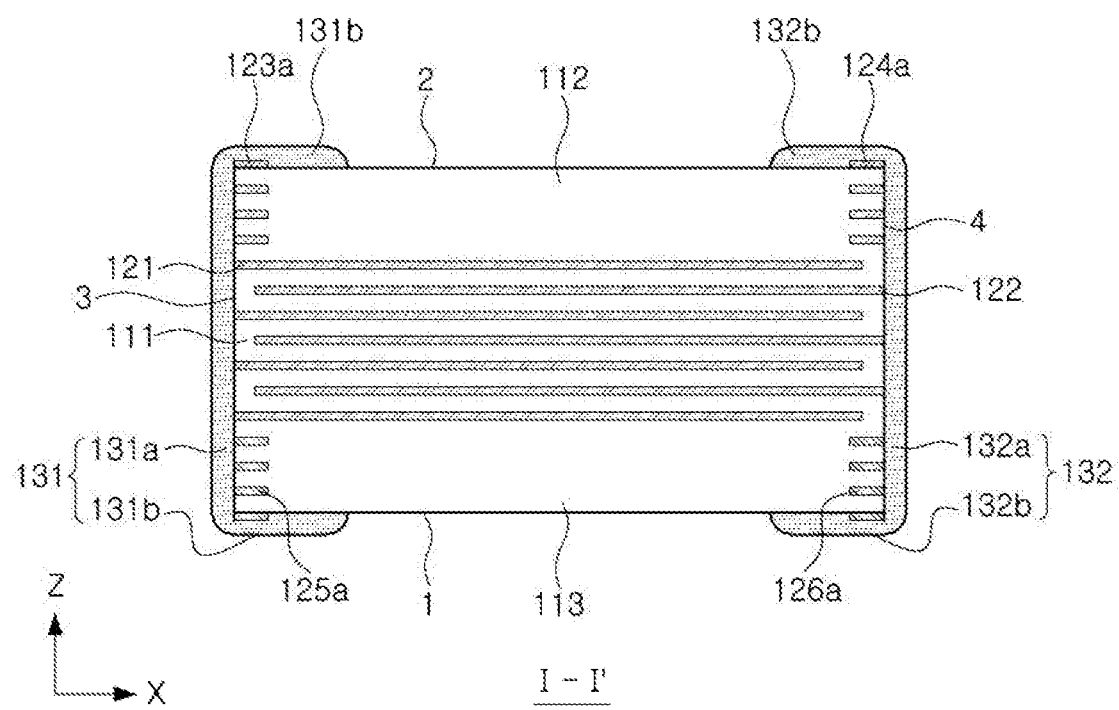
FIG. 2 is a cross-sectional view taken along the line I-I' of FIG. 1.
Figure 3A:
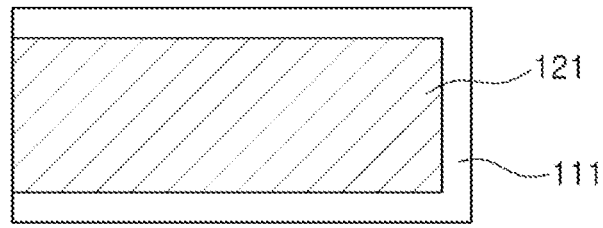
FIG. 3A, FIG. 3B, FIG. 3C, and FIG. 3D are plan views illustrating first and second internal electrodes included in the capacitor body of FIG. 1 and dummy electrodes, respectively.
Figure 3B:
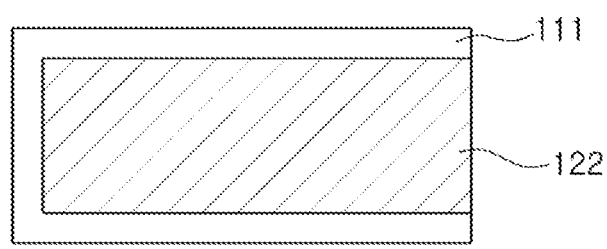
Figure 3C:
Figure 3D:
Figure 4:
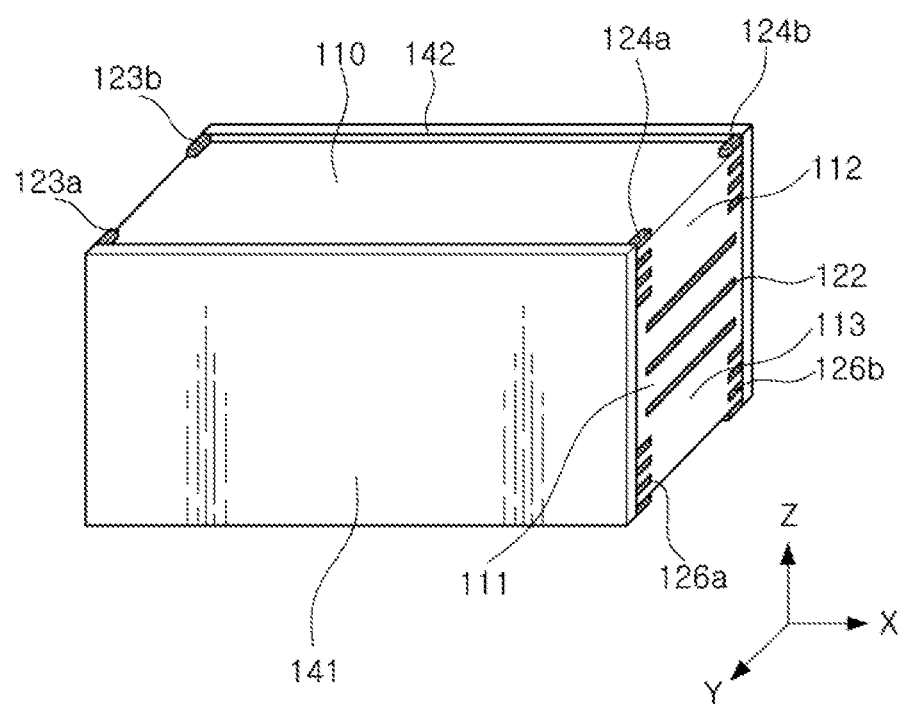
FIG. 4 is a perspective view illustrating an external electrode removed from FIG. 1.

FIG. 1 is a perspective view of a multilayer capacitor according to an exemplary embodiment of the present disclosure, FIG. 2 is a cross-sectional view taken along line I-I' of FIG. 1, FIGS. 3A to 3D are plan views illustrating the first and second internal electrodes included in the capacitor body of FIG. 1 and the dummy electrodes, respectively, and FIG. 4 is a perspective view illustrating the external electrodes removed from FIG. 1.

Referring to FIGS. 1 to 4, a multilayer capacitor 100 according to the exemplary embodiment of the present disclosure includes a capacitor body 110, first and second external electrodes 131 and 132, and a plurality of dummy electrodes 123a, 123b, 124a, 124b, 125a, 125b, 126a, and 126b.

The capacitor body 110 is formed by laminating a plurality of dielectric layers 111 in the Z direction and then sintering the plurality of dielectric layers 111, the plurality of dielectric layers 111 forming the capacitor body 110 are sintered, and boundaries between the dielectric layers 111 adjacent to each other may be integrated, such that they may be difficult to confirm without using a scanning electron microscope (SEM).

At this time, the capacitor body 110 may have a generally hexahedral shape, but the present disclosure is not limited thereto. In addition, the shape and dimensions of the capacitor body 110 and the number of laminated layers of the dielectric layer 111 are not limited to those illustrated in the drawings of the exemplary embodiment of the present disclosure.

In the exemplary embodiment of the present disclosure, for convenience of explanation, two external surfaces of the capacitor body 110 opposing each other in the Z direction are defined as first and second external surfaces 1 and 2, another two external surfaces connected to the first and second external surfaces 1 and 2 and opposing each other in the X direction are defined as third and fourth external surfaces 3 and 4, and further another two external surfaces connected to the first and second external surfaces 1 and 2 and connected to the third and fourth external surfaces 3 and 4 and opposing each other in the Y direction are defined as fifth and sixth external surfaces 5 and 6. In addition, in the exemplary embodiment of the present disclosure, the first external surface 1 may be a surface in the mounting direction.

The dielectric layer 111 may include a ceramic material having a high dielectric constant, for example, a barium titanate ($BaTiO_3$)-based ceramic powder, a strontium titanate ($SrTiO_3$)-based ceramic powder, or the like. However, the present disclosure is not limited thereto, as long as sufficient capacitance may be obtained.

A ceramic additive, an organic solvent, a plasticizer, a binding agent, a dispersant, and the like, may further be added to the dielectric layer 111, together with the ceramic powder.

As the ceramic additive, for example, a transition metal oxide or a transition metal carbide, a rare earth element, magnesium (Mg), aluminum (Al), or the like, may be used.

The capacitor body 110 may include an active area serving as a part contributing to forming the capacitance of the capacitor and upper and lower cover layers 112 and 113 formed respectively above and below the active area as the upper and lower margin portions.

The active area may include a plurality of first and second internal electrodes 121 and 122 alternately disposed with the dielectric layer 111 interposed therebetween, and one ends of the first and second internal electrodes 121 and 122 may be exposed through the third and fourth external surfaces 3 and 4 of the capacitor body 110, respectively.

The upper and lower cover layers 112 and 113 may have the same material and configuration as the dielectric layer 111 except for not including internal electrodes.

In addition, the upper and lower cover layers 112 and 113 may be formed by laminating a single dielectric layer or two or more dielectric layers on the upper and lower external surfaces of the active area in the Z direction, respectively, and the upper and lower cover layers 112 and 113 may prevent damage to the first and second internal electrodes 121 and 122 due to physical or chemical stress.

The first and second internal electrodes 121 and 122 are electrodes having different polarities, and are formed by printing a conductive paste containing a conductive metal to a predetermined thickness on the dielectric layer 111 and may be electrically insulated from each other by the dielectric layer 111 disposed in the middle.

The conductive metal may be made of one of, for example, silver (Ag), palladium (Pd), platinum (Pt), nickel (Ni), copper (Cu) or alloys thereof, but the present disclosure is not limited thereto.

In addition, the conductive paste may be printed by a screen printing method, a gravure printing method, or the like, but the present disclosure is not limited thereto.

In addition, the first and second internal electrodes 121 and 122 may be electrically connected to the first and second external electrodes 131 and 132 through portions of the first and second internal electrodes 121 and 122 which are alternately exposed through the third and fourth external surfaces 3 and 4 of the capacitor body 110, respectively.

Therefore, when a voltage is applied to the first and second external electrodes 131 and 132, charges are accumulated between the first and second internal electrodes 121 and 122.

At this time, the capacitance of the multilayer capacitor 100 is proportional to an area of overlap of the first and second internal electrodes 121 and 122 in the Z direction in the active area.

The first and second external electrodes 131 and 132 are provided with voltages having different polarities, and may respectively be connected to exposed portions of the first and second internal electrodes 121 and 122 to be electrically connected.

In an exemplary embodiment of the present disclosure, a plating layer may be formed on the surfaces of the first and second external electrodes 131 and 132.

For example, the first and second external electrodes 131 and 132 may include first and second conductive layers, first and second nickel (Ni) plating layers formed on the first and second conductive layers, and first and second tin (Sn) plating layers formed on the first and second plating layers, respectively.

The first external electrode 131 may include a first connection portion 131a and a first band portion 131b.

The first connection portion 131a is formed on the third external surface 3 of the capacitor body 110 and is connected to the first internal electrode 121, and the first band portion 131b extends from the first connection portion 131a to portions of the first, second, fifth, and sixth external surfaces of the capacitor body 110.

The second external electrode 132 may include a second connection portion 132a and a second band portion 132b.

The second connection portion 132a is formed on the fourth external surface of the capacitor body 110 and is connected to the second internal electrode 122, and the second band portion 132b extends from the second connection portion 132a to portions of the first, second, fifth, and sixth external surfaces of the capacitor body 110.

A plurality of dummy electrodes 123a, 123b, 124a and 124b are disposed in the Z direction with dielectric layer interposed therebetween in an upper cover layer 112, and are exposed through four corners of the capacitor body 110 in one dielectric layer.

Moisture permeation into the upper corner portion of the capacitor body 110 may be blocked, thereby improving moisture resistance reliability of the multilayer capacitor 100.

In other words, the upper dummy electrodes 123a, 123b, 124a, and 124b are exposed through the third or fourth external surfaces 3 or 4 or the fifth or sixth external surfaces 5 or 6 of the capacitor body 110, and thus, the upper dummy electrodes 123a, 123b, 124a, and 124b are in contact with upper end portions of the first and second band portions 131b and 132b.

In the exemplary embodiment of the present disclosure, four upper dummy electrodes 123a, 123b, 124a, and 124b are disposed one by one at four corners of one dielectric layer, and the respective upper dummy electrodes 123a, 123b, 124a, and 124b are spaced apart from each other in the X and Y directions.

In addition, the dummy electrodes 123a, 123b, 124a, and 124b are disposed on the upper surface of the dielectric layer formed at the uppermost end of the upper cover layer 112.

Therefore, the upper dummy electrodes 123a, 123b, 124a, and 124b are located between the second external surface 2 of the capacitor body 110 and a bottom external surface of the upper first and second band portions 131b and 132b.

The upper dummy electrodes 123a, 123b, 124a, and 124b are exposed through the third or fourth external surfaces 3 or 4 of the capacitor body 110, respectively, and are connected to the upper end portions of the first or second connection portion 131a or 132a.

Therefore, fixing strength of the first and second external electrodes 131 and 132 may be improved in the upper portion of the Z direction in which an upper end edge of the capacitor body 110 is located.

A plurality of lower dummy electrodes 125a, 125b, 126a, and 126d are disposed in the Z direction with a dielectric layer interposed therebetween in the lower cover layer 113, and are exposed through four corners of the capacitor body 110 in one dielectric layer.

Moisture permeation into the lower corner portions of the capacitor body 110 may be blocked, thereby improving the moisture resistance reliability of the multilayer capacitor 100.

In other words, the lower dummy electrodes 125a, 125b, 126a, and 126b are exposed through the third or fourth external surfaces 3 or 4 and the fifth or sixth external surfaces 5 or 6, of the capacitor body 110, and are in contact with the upper end portions of the first and second band portions 131a and 132a.

In the exemplary embodiment of the present disclosure, the four lower dummy electrodes 125a, 125b, 126a, and 126b are disposed at four corners of one dielectric layer, and the respective lower dummy electrodes 125a, 125b, 126a, and 126b are spaced from each other in the X and Y directions.

In addition, the lower dummy electrodes 125a, 125b, 126a, and 126b are also disposed on the bottom surface of the dielectric layer formed at the lowermost end of the lower cover layer 113.

Therefore, the lower dummy electrodes 125a, 125b, 126a, and 126b disposed at the lowermost end of the lower cover layer 113 are located between the first external surface 1 of the capacitor body 110 and the inner surfaces of the lower first and second band portions 131b and 132b.

The lower dummy electrodes 125a, 125b, 126a, and 126b disposed at the lowermost end of the lower cover layer 113 are exposed through the third or fourth external surfaces 3 or 4, respectively, of the capacitor body 110 to be connected to the lower end portions of the first or second connection portion 131a or 132a.

Therefore, the fixing strength of the first and second external electrodes 131 and 132 may be improved at the lower portion in the Z direction in which a lower end edge of the capacitor body 110 is located.

In an exemplary embodiment of the present disclosure, insulating layers 141 and 142 may be disposed on the fifth and sixth external surfaces 5 and 6 of the capacitor body 110, respectively.

The insulating layers 141 and 142 may cover exposed portions through the fifth and sixth external surfaces 5 and 6 of the capacitor body 110 from the plurality of dummy electrodes 123a, 123b, 124a, 124b, 125a, 125b, 126a, and 126b.

Therefore, a margin portion of the capacitor body 110 in the Y direction may further secured in the capacitor body 110, thereby further improving the moisture resistance reliability of the multilayer capacitor 100.

In the multilayer capacitor in the related art, an edge of the capacitor body has characteristics in which the permeation of moisture, ions, conductive foreign substances, and the like are easy, and moisture resistance reliability is poor.

To prevent such a problem, internal electrodes may be printed in a structure in which a predetermined margin portion is provided at a periphery of the dielectric layer, such that a step portion between the margin portion and an area in which the internal electrode is formed may occur.

The capacitor body is formed by laminating a plurality of sheets on which internal electrodes are printed and then pressing the sheets. But, the capacitor body has a limitation in shrinking the margin portion having a step portion, and delamination in which portions of the dielectric layers laminated at the step are peeled off from each other may occur.

Therefore, through the delamination, a phenomenon in which the above-described moisture, ions, conductive foreign substances, and the like penetrate into the exposed surface of the internal electrode may be exacerbated, and this phenomenon may be further exacerbated particularly in super-high capacity products having a large number of laminated sheets.

However, in the multilayer capacitor in the exemplary embodiment of the present disclosure, since a plurality of dummy electrodes are laminated on the upper and lower cover layers of the capacitor body 110 along a lamination direction of the dielectric layers, and the plurality of dummy electrodes are disposed on the corner portions of the dielectric layers, the moisture penetration into the corner portion of the multilayer capacitor 110 may be blocked to improve moisture resistance, while suppressing an occurrence of a step portion at the time of providing the capacitor body, thereby reducing the occurrence of delamination and further improving the moisture resistance reliability of the multilayer capacitor.

The insulating layers 141 and 142 may be respectively disposed on the fifth and sixth external surfaces 5 and 6 of the capacitor body 110 to serve to suppress a formation height of a solder filet when the multilayer capacitor 100 is mounted on a substrate and improving acoustic noise.

The insulating layers 141 and 142 may be formed by applying an epoxy, a ceramic, or the like to the fifth and sixth external surfaces 5 and 6 of the capacitor body 110, respectively.

Figure 5:
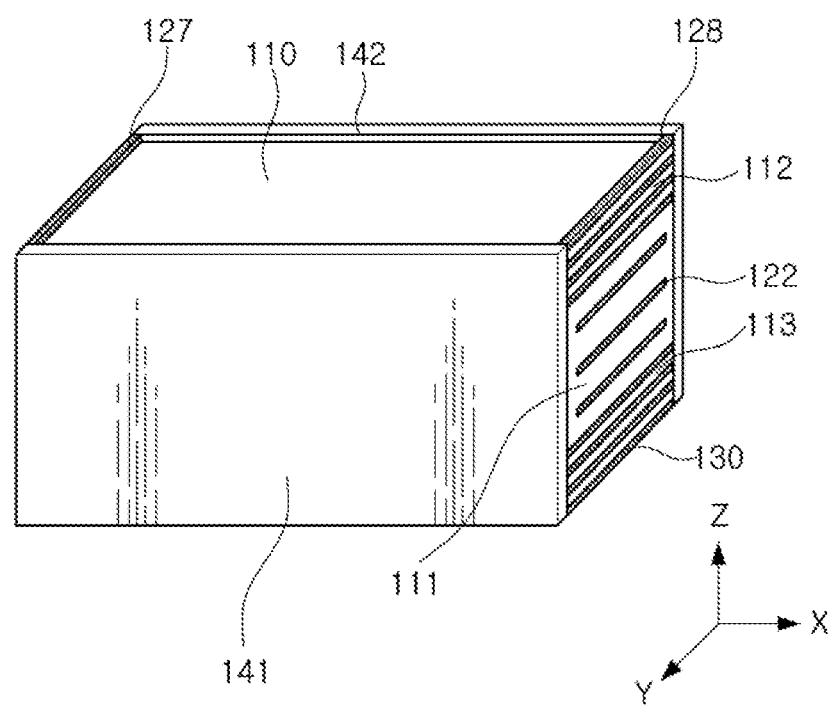
FIG. 5 is a perspective view illustrating an external electrode removed from a multilayer capacitor of FIG. 1 according to another exemplary embodiment of the present disclosure.
Figure 6A:
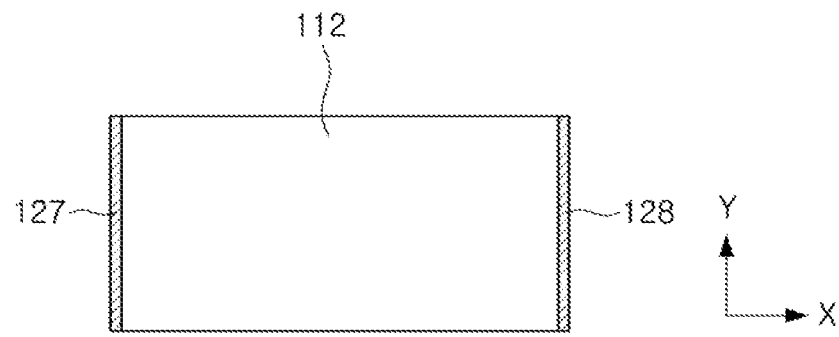
FIG. 6A and FIG. 6B are plan views illustrating a dummy electrode included in the capacitor body of FIG. 5.
Figure 6B:
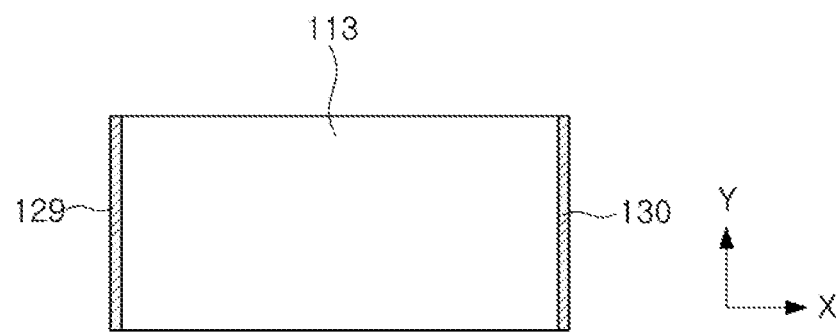

FIG. 5 is a perspective view in which external electrodes are removed from a multilayer capacitor according to another exemplary embodiment of the present disclosure, and FIGS. 6A and 6B are plan views illustrating dummy electrodes included in the capacitor body of FIG. 5. Here, structures of the internal electrode and the external electrode are the same as those of an exemplary embodiment described above, and thus, a detailed description thereof will be omitted to avoid redundancy.

Referring to FIGS. 5 and 6, the dummy electrodes 127, 128, 129, and 130 may be exposed through an entirety of the third external surface 3 or an entirety of the fourth external surface 4 of the dielectric layer.

In another exemplary embodiment of the present disclosure, referring to FIGS. 5 and 6, the dummy electrodes 127, 128, 129, and 130 may be exposed through an entirety of the first external surface 1 or an entirety of the second external surface 2 of the dielectric layer.

Accordingly, moisture penetrating through both cross-sections of the upper and lower sides of the capacitor body 110 may be effectively blocked, thereby further improving the moisture resistance reliability of the multilayer capacitor 100.

In addition, the contact area between the dummy electrode and the first and second external electrodes 131 and 132 may be increased and the fixing strength of the first and second external electrodes 131 and 132 at the upper and lower end portions of the capacitor body 110 may be improved.

As set forth above, according to the exemplary embodiments in an exemplary embodiment of the present disclosure, the plurality of dummy electrodes is disposed in a lamination direction of the dielectric layer at the corner portions of the capacitor body, such that moisture penetrating into the corner portions in which moisture resistance is weak is blocked from the capacitor body to improve moisture resistance reliability.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multilayer capacitor comprising:
   a capacitor body including an active area including a plurality of dielectric layers and a plurality of first and second internal electrodes alternately disposed with the dielectric layer interposed therebetween, upper and lower cover layers disposed on upper and lower surfaces of the active area, and having first and second surfaces opposing each other, third and fourth surfaces connected to the first and second surfaces and opposing each other, and fifth and sixth surfaces connected to the first and second surfaces, connected to the third and fourth surfaces and opposing each other, one ends of the first and second internal electrodes being exposed through the third and fourth surfaces, respectively;
   first and second external electrodes including first and second connection portions disposed on the third and fourth surfaces of the capacitor body, respectively, to be connected to the first and second internal electrodes, respectively, and first and second band portions each extending from the first and second connection portions to portions of the first, second, fifth, and sixth surfaces of the capacitor body, respectively; and a plurality of dummy electrodes including a first plurality of dummy electrodes and a second plurality of dummy electrodes, wherein the first plurality of dummy electrodes are disposed in the upper and lower cover layers with a dielectric layer interposed therebetween, and exposed through corners of the capacitor body, wherein at least two of the second plurality of dummy electrodes are respectively disposed between the first band portion and the first and second surfaces of the capacitor body, wherein at least another two of the second plurality of dummy electrodes are respectively disposed between the second band portion and the first and second surfaces of the capacitor body, wherein a first and second region of the third and fourth surfaces, respectively, corresponding to the active area are devoid of dummy electrodes being exposed therethrough, and wherein four of the second plurality of dummy electrodes are respectively disposed at four corners of at least one of the first or second surface of the capacitor body.

2. The multilayer capacitor of claim 1, wherein the plurality of dummy electrodes disposed in one dielectric layer are spaced apart from each other.

3. The multilayer capacitor of claim 1, wherein the plurality of dummy electrodes are exposed through the third or fourth surfaces of the capacitor body.

4. The multilayer capacitor of claim 1, wherein the first plurality of dummy electrodes are exposed through the fifth or sixth surfaces of the capacitor body.

5. The multilayer capacitor of claim 1, wherein the first plurality of dummy electrodes are exposed through each corner of the capacitor body and are disposed to be spaced apart from each other.

6. The multilayer capacitor of claim 1, wherein the first plurality of dummy electrodes are disposed one by one at four corners of one dielectric layer.

7. The multilayer capacitor of claim 6, wherein the first plurality of dummy electrodes are exposed through an entirety of the third surface or an entirety of the fourth surface of the capacitor body.

8. The multilayer capacitor of claim 1, wherein the second plurality of dummy electrodes are exposed along through an entirety of the first surface or an entirety of the second surface of the capacitor body.

9. The multilayer capacitor of claim 1, further comprising an insulating layer disposed on the fifth and sixth surfaces of the capacitor body.

10. The multilayer capacitor of claim 1, wherein the first and second band portions each extend from the first and second connection portions to portions of the first, second, fifth, and sixth surfaces of the capacitor body, to cover the plurality of dummy electrodes.

* * * * *